US010635556B2

(12) United States Patent
Katayama et al.

(10) Patent No.: US 10,635,556 B2
(45) Date of Patent: Apr. 28, 2020

(54) DEVICE MAINTENANCE APPARATUS, METHOD FOR MAINTAINING DEVICE, AND STORAGE MEDIUM

(71) Applicant: Yokogawa Electric Corporation, Musashino-shi, Tokyo (JP)

(72) Inventors: Hirotaka Katayama, Tokyo (JP); Hiromi Okamoto, Tokyo (JP); Yuya Iketsuki, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 162 days.

(21) Appl. No.: 15/481,697

(22) Filed: Apr. 7, 2017

(65) Prior Publication Data

US 2017/0293544 A1 Oct. 12, 2017

(30) Foreign Application Priority Data

Apr. 11, 2016 (JP) ................................ 2016-079152

(51) Int. Cl.

| | |
|---|---|
| ***G06F 11/00*** | (2006.01) |
| ***G06F 11/273*** | (2006.01) |
| ***G05B 19/042*** | (2006.01) |
| ***G05B 19/418*** | (2006.01) |
| ***G06F 3/0484*** | (2013.01) |
| ***G06F 11/263*** | (2006.01) |

(52) U.S. Cl.

CPC ...... *G06F 11/2733* (2013.01); *G05B 19/0425* (2013.01); *G05B 19/4184* (2013.01); *G05B 19/41815* (2013.01); *G05B 19/41835* (2013.01); *G05B 19/41865* (2013.01); *G05B 19/41875* (2013.01); *G05B 19/41885* (2013.01); *G06F 3/0484* (2013.01); *G06F 11/263* (2013.01); *Y02P 90/14* (2015.11); *Y02P 90/86* (2015.11)

(58) Field of Classification Search

CPC ............... G06F 11/2733; G06F 11/321; G01R 31/318519; G05B 19/33331

See application file for complete search history.

(56) References Cited

U.S. PATENT DOCUMENTS

| | | | | |
|---|---|---|---|---|
| 5,815,513 | A * | 9/1998 | Hiraide ............ | G01R 31/31830 703/15 |
| 5,970,430 | A | 10/1999 | Burns et al. | |
| 6,434,500 | B1 * | 8/2002 | Boehne .............. | G05B 19/4184 702/120 |
| 2001/0005132 | A1 * | 6/2001 | Nishikawa ....... | G01R 31/31830 324/762.01 |
| 2002/0041538 | A1 * | 4/2002 | Hayashi .................. | G04F 10/00 368/121 |

(Continued)

FOREIGN PATENT DOCUMENTS

| | | |
|---|---|---|
| JP | 2001-524226 A | 11/2001 |
| JP | 2004-533681 A | 11/2004 |

(Continued)

*Primary Examiner* — Christopher S McCarthy

(74) *Attorney, Agent, or Firm* — Sughrue Mion, PLLC

(57) ABSTRACT

A device maintenance apparatus includes a setting operator configured to allow for setting a test pattern, the test pattern being set to define a change of output signals output from a device over time, and an execution operator configured to make the device output the output signals based on the set test pattern.

15 Claims, 11 Drawing Sheets

(56) References Cited

U.S. PATENT DOCUMENTS

| | | | | |
|---|---|---|---|---|
| 2003/0128045 | A1* | 7/2003 | Ochi | G11C 29/56 324/762.01 |
| 2004/0017184 | A1* | 1/2004 | Shen | G01R 13/0236 324/762.01 |
| 2004/0199351 | A1* | 10/2004 | Ott | G05B 9/02 702/108 |
| 2005/0004775 | A1* | 1/2005 | Cirkel | G01R 31/275 702/119 |
| 2006/0036389 | A1* | 2/2006 | Ozora | G01R 31/319 702/108 |
| 2006/0085715 | A1* | 4/2006 | Kim | G01R 31/31723 714/742 |
| 2006/0247882 | A1* | 11/2006 | Tada | G01R 31/31932 702/117 |
| 2007/0170927 | A1* | 7/2007 | Harada | G01R 31/31717 324/527 |
| 2008/0024842 | A1 | 1/2008 | Tsukahara et al. | |
| 2009/0150733 | A1* | 6/2009 | Takizawa | G01R 31/3191 714/734 |
| 2010/0145476 | A1 | 6/2010 | Junk et al. | |
| 2012/0038458 | A1* | 2/2012 | Toepke | G05B 19/042 340/6.1 |
| 2013/0331999 | A1* | 12/2013 | Vaughn | G05B 15/02 700/291 |
| 2015/0160816 | A1 | 6/2015 | Furihata | |
| 2017/0371325 | A1* | 12/2017 | Kodama | G05B 19/41855 |
| 2019/0324444 | A1* | 10/2019 | Cella | G05B 19/4184 |

FOREIGN PATENT DOCUMENTS

| | | | |
|---|---|---|---|
| JP | 2005044316 | A | 2/2005 |
| JP | 2008-35295 | A | 2/2008 |
| JP | 2012-208697 | A | 10/2012 |
| JP | 2015-109011 | A | 6/2015 |
| WO | 98/14848 | A1 | 4/1998 |
| WO | 02/082193 | A2 | 10/2002 |

* cited by examiner

DEVICE MAINTENANCE APPARATUS, METHOD FOR MAINTAINING DEVICE, AND STORAGE MEDIUM

BACKGROUND OF THE INVENTION

Field of the Invention

The present invention relates to a device maintenance apparatus, a method for maintaining a device, and a storage medium.

Priority is claimed on Japanese Patent Application No. 2016-079152, filed on Apr. 11, 2016, the contents of which are incorporated herein by reference.

Description of Related Art

In a plant, a factory, or the like (hereinafter, collectively referred to as a "plant"), for example, an industrial plant such as a chemical industrial plant, a plant for managing and controlling a wellhead such as a gas field and oil field and its surroundings, a plant for managing and controlling an electrical power generation such as water power, fire power, and nuclear power, a plant for managing and controlling an energy harvesting such as photovoltaic power generation and wind-power generation, and a plant for managing and controlling a water and sewerage, and a dam, a distributed control system (DCS) in which on-site devices such as measures and actuators, which are referred to as field devices, are connected via a communication means to controllers, which control the field devices, has been implemented to realize a high level of automated operation. In the plant in which such a distributed control system is implemented, the maintenance for the field devices (hereinafter, also simplified and referred to as "devices") is regularly or irregularly performed by workers in order to prevent abnormal operation, maintain measurement accuracy, and the like.

The maintenance of the field devices is performed using a device maintenance apparatus capable of performing wire communication or wireless communication with the field devices. The device maintenance apparatus includes, for example, a laptop computer, a tablet computer, a PDA (Personal Digital Assistant), and a smartphone, each of which a program provided for maintaining the field devices is installed into. The maintenance items include various maintenance works in accordance with the field devices, which are maintenance targets, such as a check work for reading and checking device information set in the field devices and a setting work for setting new device information into the field devices.

The device maintenance apparatus is connected to the field devices via the wire communication or the wireless communication, and displays the list of the connected field devices on a display (for example, refer to Japanese Unexamined Patent Application, First Publication No. 2015-109011). The workers appropriately switch pages of the device maintenance apparatus, such as a page for selecting one field device from the displayed list of field devices, a page for selecting a category of maintenance items for the selected field device, a page for selecting a maintenance item in the selected category, a page for setting the selected maintenance item, a page for executing the set maintenance item, a page for receiving results of the executed maintenance item, a page for outputting the execution results of the maintenance item, and the like, and perform the maintenance work associated with the maintenance item.

The maintenance items include various tests using the field device. The test using the field device includes a test which makes each field device output output signals (test values).

In the case of the test using the field device, it is necessary to set, to the field device, a level of output signals (test values) used for the test before performing the test. For example, in a loop test using the field device, an output level of output signals (test output values) is changed based on a test pattern and the loop test is performed. A setting work for changing the setting of the test output values by a maintenance worker is required in order to change the test output values. For example, if the test output values in the test pattern of the loop test have five steps of 0%, 25%, 50%, 75%, and 100%, it is necessary for the worker in charge of maintenance work to repeatedly perform the setting work of the test setting values five times. Therefore, there are some cases where the efficiency of the maintenance work is reduced. In particular, if a lot of field devices used for the loop test exist in the plant, the setting works, the number of which is depending on the test pattern, are required for each field device. Therefore, there are some cases where the efficiency of the maintenance work is reduced.

SUMMARY OF THE INVENTION

An aspect of the present invention provides a device maintenance apparatus, a method for maintaining a device, and a storage medium, which are capable of improving the efficiency of maintenance work.

A device maintenance apparatus according to one aspect of the present invention may include a setting operator configured to allow for setting a test pattern, the test pattern being set to define a change of output signals output from a device over time, and an execution operator configured to make the device output the output signals based on the set test pattern.

In the above-described device maintenance apparatus, the setting operator may be configured to set an output level of the output signals in the test pattern and the output level may be changed over time.

In the above-described device maintenance apparatus, the setting operator may be configured to set an output time of the output signals in the test pattern for each output level.

In the above-described device maintenance apparatus, the setting operator may be configured to add to the set test pattern a step which defines output of output signals of arbitrary output level.

In the above-described device maintenance apparatus, the setting operator may be configured to cancel, from a plurality of steps set in the test pattern, an arbitrary step.

In the above-described device maintenance apparatus, the setting operator may be configured to set, in the test pattern, a repeat count of the output of the output signals by the device based on the test pattern.

In the above-described device maintenance apparatus, the setting operator may be configured to display progress of the output of the output signals by the device based on the test pattern.

In the above-described device maintenance apparatus, the setting operator may be configured to graphically display the progress.

In the above-described device maintenance apparatus, the setting operator may be configured to display a button or pull-down menu allowing for changing an output level of the output signals and a pull-down menu allowing for changing an output time of the output signals for each output level in the same page.

In the above-described device maintenance apparatus, the setting operator may be configured to independently change the output level of the output signals for each step set in the test pattern.

A device maintenance method according to one aspect of the present invention may include setting a test pattern to define a change of output signals output from a device over time, and making the device output the output signals based on the set test pattern.

In the above-described device maintenance method, the setting of the test pattern may include setting an output level of the output signals in the test pattern and the output level is changed over time.

In the above-described device maintenance method, the setting of the test pattern may include setting an output time of the output signals in the test pattern for each output level.

The above-described device maintenance method may further include adding to the set test pattern a step which defines output of output signals of arbitrary output level.

The above-described device maintenance method may further include canceling, from a plurality of steps set in the test pattern, an arbitrary step.

In the above-described device maintenance method, the setting of the test pattern may include setting a repeat count of the output of the output signals by the device in the test pattern.

The above-described device maintenance method may further include displaying progress of the output of the output signals by the device based on the test pattern.

In the above-described device maintenance method, the display of the progress includes graphically displaying the progress.

The above-described device maintenance method may further include displaying a button or pull-down menu allowing for changing an output level of the output signals and a pull-down menu allowing for changing an output time of the output signals for each output level in the same page.

A non-transitory computer-readable storage medium storing a device maintenance program according to one aspect of the present invention, which when executed by a computer, may cause the computer to set a test pattern to define a change of output signals output from a device over time and make the device output the output signals based on the set test pattern.

One aspect of the present invention can provide the device maintenance apparatus, the method for maintaining a device, and the storage medium, which are capable of improving the efficiency of maintenance work.

DETAILED DESCRIPTION OF THE INVENTION

Hereinafter, a device maintenance apparatus, a method for maintaining a device, and a storage medium according to an embodiment of the present invention will be described with reference to the drawings.

Figure 1:
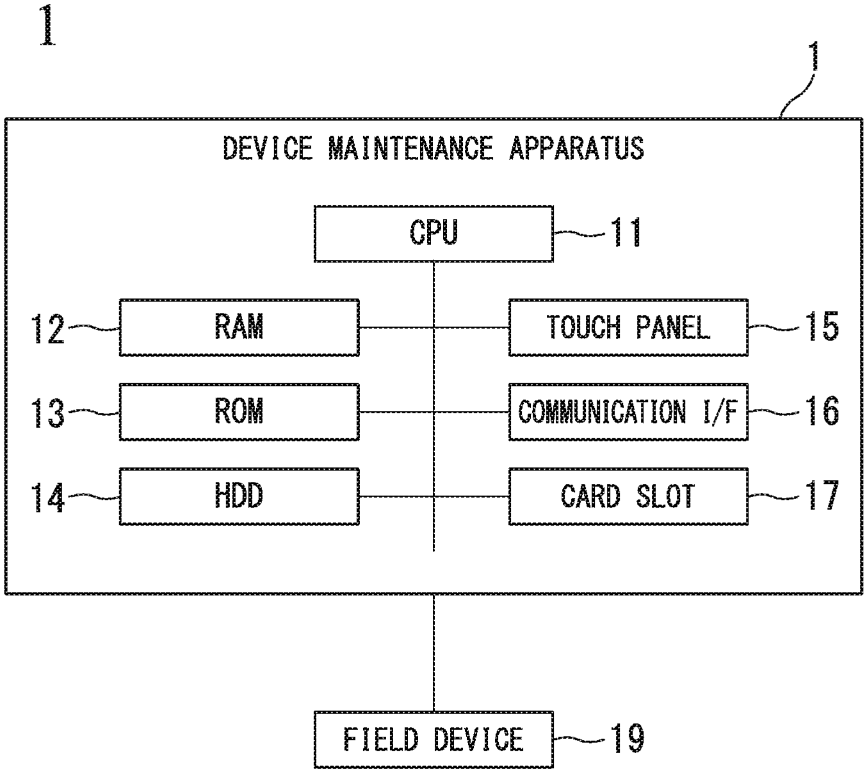
FIG. 1 is a block diagram showing an example of hardware configurations of a device maintenance apparatus according to an embodiment.

First, the hardware configuration of a device maintenance apparatus will be described with reference to FIG. 1. FIG. 1 is a block diagram showing an example of hardware configurations of a device maintenance apparatus 1 according to the embodiment.

In FIG. 1, the device maintenance apparatus 1 includes a CPU (Central Processing Unit) 11, a RAM (Random Access Memory) 12, a ROM (Read Only Memory) 13, an HDD (Hard Disk Drive) 14, a touch panel 15, a communication I/F (Interface) 16, and a card slot 17. The device maintenance apparatus 1 is communicatively connected to a field device 19.

The device maintenance apparatus 1 includes a general-purpose apparatus such as a laptop computer, a tablet computer, a PDA, or a smart phone, and a dedicated apparatus for maintaining a device. The device maintenance apparatus 1 includes a device maintenance program for maintaining a field device, and executes the device maintenance program to support the maintenance work for the field device. The device maintenance apparatus 1 is carried in a plant and operated by a worker performing the maintenance work.

The CPU 11 executes programs stored in the RAM 12, the ROM 13, or the HDD 14 to control the device maintenance apparatus 1. The device maintenance program is obtained from a storage medium storing the device maintenance program, a server for providing the device maintenance program via a network, or the like, installed into the HDD 14, and stored in the RAM 12. The device maintenance program stored in the RAM 12 is readable by the CPU 11.

The touch panel 15 has an operation and display function including an operation input function and a display function. The touch panel 15 displays a maintenance list in which maintenance information related to the maintenance of the filed device and work targets including maintenance items for the targeted device are listed. In addition, the touch panel 15 enables the worker to perform operation input using fingertips, a touch pen, or the like. In the present embodiment, a case will be described in which the device maintenance apparatus 1 includes the touch panel 15 having the operation and display function, but the device maintenance apparatus 1 may include a display having a display function and an operation input apparatus having an operation input function. In this case, the present embodiment can be implemented using the display page of the display instead of the touch panel 15 and using the input to the operation input apparatus instead of the touch panel 15. The touch panel 15 may be implemented in various types, such as a display in a head-mount type, a glasses type, a watch type, or the like.

The communication I/F 16 controls the communication with the field device 19 or other apparatuses using wire communication or wireless communication. The communication I/F 16 includes, for example, a network adaptor. The other apparatuses include, for example, another device maintenance apparatus, a maintenance information management server for managing maintenance information, a DCS (Distributed Control System) control apparatus, an FA (Factory Automation) computer, and a PLC (Programmable Logic Controller), which are not shown.

The communication I/F 16 controls the communication with the field device 19 using a communication protocol adaptable to the field device 19. Various communication protocols are used for various field devices 19 used in the plant. Therefore, the communication I/F 16 controls the communication with each of the field devices 19 using a communication protocol adaptable to each of the field devices 19. For example, the communication I/F 16 controls the communication with the field device 19 using ISA100, which is a wireless communication standard of an ISA (International Society of Automation). The communication I/F 16 may control the communication with the field device 19 using a dedicated communication protocol for industrial instruments, such as HART (Highway Addressable Remote Transducer) (registered trademark), BRAIN (registered trademark), FOUNDATION Fieldbus, or PROFIBUS. The communication I/F 16 may control the communication with the field device 19 or the DCS using a general-purpose communication protocol, such as wireless LAN communication, wired LAN communication, infrared communication, or near field wireless communication.

The card slot 17 receives the insertion of a PC card. The card slot 17 makes available the function of the inserted PC card in the device maintenance apparatus 1. The PC card can provide, for example, a communication function for implementing specific communication or a storage function.

The field device 19 communicatively connected to the device maintenance apparatus 1 includes a device for inputting signals indicating physical quantity (pressure, temperature, or the like) into the device maintenance apparatus 1, for example, a differential pressure gauge, a thermometer, or a flowmeter, and a device for receiving, from the device maintenance apparatus 1, control signals used to change an opening amount of an adjusting valve, for example, a adjusting valve. In FIG. 1, the figure is simplified and only one field device 19 is shown. However, as described above, various field devices 19 may be used in the plant and the device maintenance apparatus 1 may be connected to a plurality of field devices 19. This ends the description of the hardware configuration of the device maintenance apparatus 1 with reference to FIG. 1.

Figure 2:
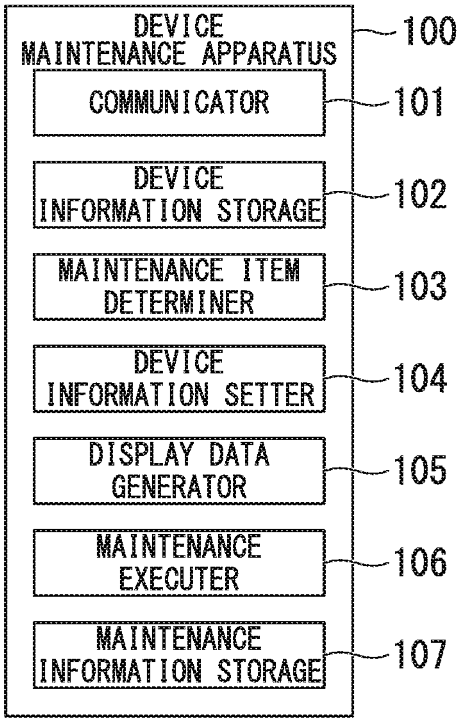
FIG. 2 is a block diagram showing an example of functional configurations of the device maintenance apparatus according to the embodiment.

Next, the functional configuration of the device maintenance apparatus will be described. FIG. 2 is a block diagram showing an example of functional configurations of a device maintenance apparatus 100 according to the embodiment. In the following description, FIG. 1 will be appropriately referred.

In FIG. 2, the device maintenance apparatus 100 has each function of a communicator 101, a device information storage 102, a maintenance item determiner 103, a device information setter 104, a display data generator 105, a maintenance executer 106, and a maintenance information storage 107. Each function described above of the device maintenance apparatus 100 is implemented by executing the program using the CPU 11 shown in FIG. 1. That is, each function described above of the device maintenance apparatus 100 is a functional module implemented by software.

The communicator 101 controls the communication with the field device 19 or other devices via the communication I/F 16 and acquires the information of the field device 19. The setting of parameters (device information) of the field devices 19 in conformance with a standard, for example, ISA100, HART, or BRAIN, the reading of parameters, the check of parameters, and the like are performed by the communication controlled by the communicator 101. The communicator 101 may control wireless LAN communication, wired LAN communication, infrared communication, near field wireless communication, and the like. The communicator 101 may include program modules, each of which performs control adaptable to a respective one of communication. The communicator 101 may install additional program modules required for each communication. The communicator 101 can automatically detect the field device 19 connected via the communication I/F 16 and acquire the parameters of the detected field device 19.

The acquirement method of the information from the field device 19 is not limited to the above-described method based on communication. For example, the worker may visually review and input using a keyboard, the tag name or model name of the field device 19. Otherwise, the worker may take, with a camera attached to the device maintenance apparatus 1, the nameplate of the field device 19, in which the tag name or model name is written, and the tag name or model name may be recognized and acquired from the taken image.

The device information storage 102 stores the device information of the field device 19 and the maintenance item information associated with the device information. The parameters (device information) of the field device 19 stored in the device information storage 102 include, for example, information for identifying the field device 19 such as a device tag, a device address, a manufacture, a device ID or device type, a model name, or a communication standard of the field device 19, or measured data measured by the field device 19.

The maintenance items stored in the device information storage 102 include a checking of parameters set in the field device 19, a setting of parameters to the field device 19, a predetermined test, a predetermined adjustment, and the like. The maintenance items may include an output of a report for reporting execution results of a maintenance item, and the like. In the present embodiment, the maintenance items stored in device information storage 102 include, for example, a loop test, a zero point adjustment, a span adjustment, a one-touch report, a detail diagnosis information display, a tag/address/role setting, a setting/cancel of setting limitation, an install of a DTM (Device Type Manager), an install of a DD (Device Description), a parameter acquirement, a valve calibration, a device squawk, an ISA100 provisioning, a device online service/offline service switching, a service mode switching, and a valve partial stroke test.

The device information storage 102 associates each field device 19 with a maintenance item to be executed with respect to thereto and readably stores the associated information. The device information storage 102 can associate one or more maintenance items with one field device 19. The above-described maintenance items include a maintenance item executable with respect to a predetermined field device 19 and another maintenance item not executable with respect to the predetermined field device 19. For example, the maintenance item of the valve calibration is executable with respect to a field device 19 with a valve, but is not executable with respect to another field device 19 without a valve such as a thermometer. The device information storage 102 associates each maintenance item with the field device 19 with which it is executable and stores the information. The association of the maintenance item with the device information of the field device 19 can be performed based on a setting file in which the association is previously set. The setting file may include the association of information such as a device type or a communication standard with the maintenance item. In addition, the association of the maintenance item with the field device 19 may be arbitrarily set by the worker. The association of the maintenance item with the field device 19 may be set by the device information setter 104.

The device information storage 102 may not associate any maintenance items with the field device 19, that is, it may associate zero maintenance items with the field device 19. For example, the device information storage 102 stores information indicating that no maintenance item is associated with the field device 19, which is broken or is not used. Therefore, this indicates that maintenance work is unnecessary. The device information storage 102 may store the associated information in, for example, the HDD 14.

The maintenance item determiner 103 determines one or more maintenance item to be displayed on the touch panel 15 from the maintenance items stored in the device information storage 102 based on the information of the device acquired by the communicator 101 (hereinafter, sometimes referred to as "parameters"). For example, if five maintenance items are associated with one field device 19 in the device information storage 102, the maintenance item determiner 103 determines three maintenance items from the associated five maintenance items. The details of the determination method of maintenance items will be described with reference to FIG. 3. The maintenance item determiner 103 inputs the determined maintenance items into the display data generator 105.

The device information setter 104 provides a UI (User Interface) for setting the parameters of the field devices 19 and the maintenance items to be stored in the device information storage 102. For example, the device information setter 104 previously acquires the information of the parameters of the field device 19 and the maintenance items via the communication I/F 16. The device information setter 104 displays the information of the acquired parameters of the field devices 19 and maintenance items on the touch panel 15 and enables to associate the field device 19 with the maintenance items. The device information setter 104 may input the set association information into the device information storage 102.

The display data generator 105 generates display data for displaying, on the touch panel 15, the parameters of the field device 19 acquired by the communicator 101 which is communicatively connected to the field device 19. In addition, the display data generator 105 generates display data for displaying, along with the parameters of the field device 19, the maintenance items determined by the maintenance item determiner 103 and associated with the displayed parameters of the field device 19. For example, the maintenance items associated with the parameters of the field devices 19 are displayed on the touch panel 15. If a plurality of field devices 19 are displayed, the maintenance items may be displayed for each of the field devices 19. The description "generating display data to be displayed" is simplified and this operation is sometimes represented as "displaying". The display data generator 105 may be referred to as a display. That is, the display in the present embodiment may be a display device such as a touch panel 15 or a device for generating display data to be displayed on the display device.

Figure 4:
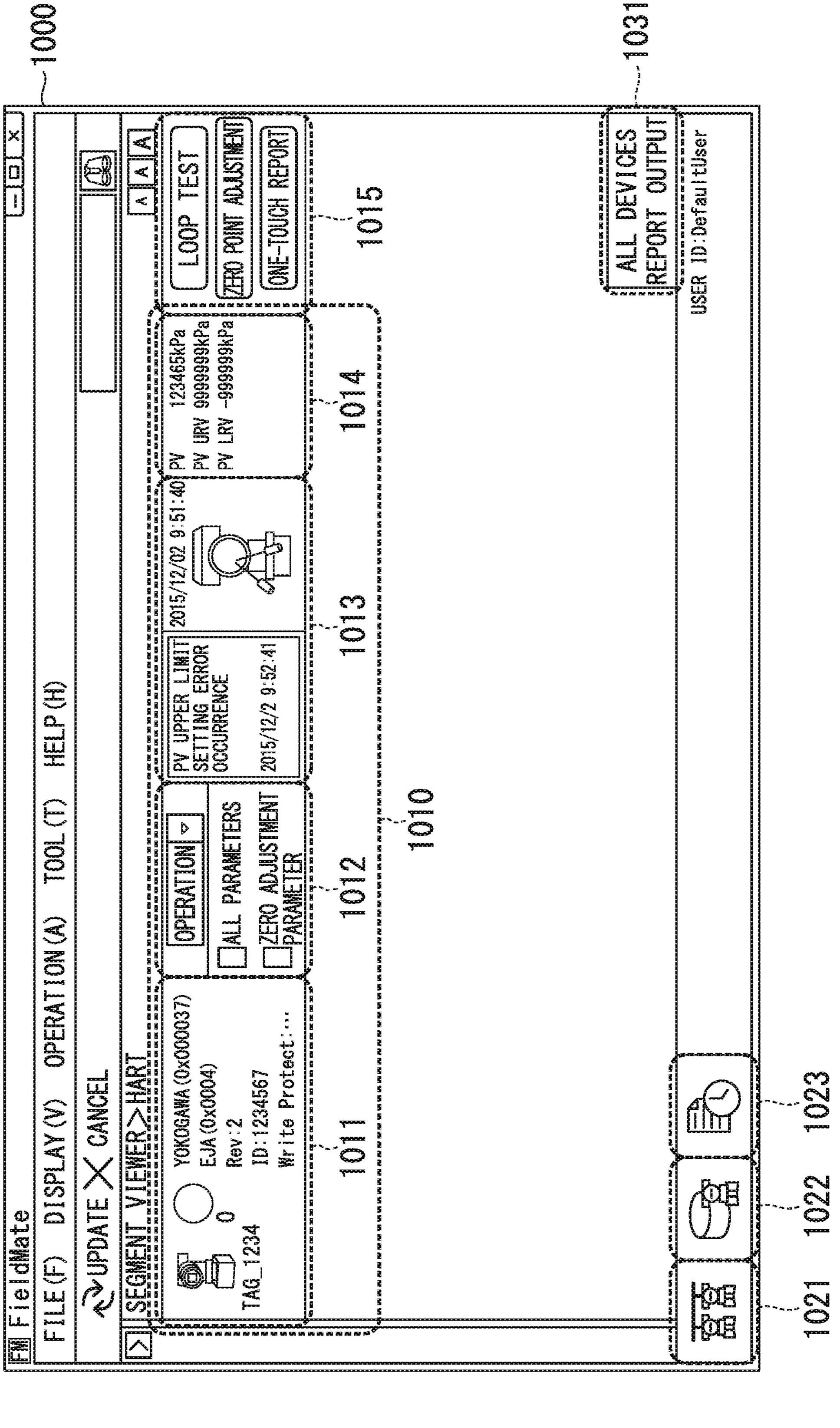
FIG. 4 is a diagram showing an example of execution buttons for executing maintenance items displayed by the device maintenance apparatus according to the embodiment.

The display data generator 105 generates data for displaying each execution button for executing a respective maintenance item determined with respect to the connected field device 19. The execution button is an operation target displayed on the touch panel 15 and one embodiment of an "operator". Each maintenance item is executed by operating the respective execution button. The execution bottom is represented by, for example, graphics, characters, or symbols. The worker can operate each execution button displayed on the touch panel 15 to execute the respective maintenance item. FIG. 4 exemplifies an execution button having a rectangular area, in which characters are displayed. The worker can touch the rectangular area of the operator displayed on the touch panel 15 to execute the respective maintenance item. The execution button may be an item selectable from a pull-down menu.

The display data generator 105 may display information with regard to the execution buttons of the maintenance items to be displayed. For example, the display data generator 105 displays the execution buttons and the past execution results of the maintenance items to be executed by the execution buttons.

The maintenance executer 106 executes the maintenance item displayed by the display data generator 105 and operated by the worker (for example, the depression of the button). Each maintenance item is separately executed by a respective operation. For example, when one maintenance item is operated, the one maintenance item is executed. The maintenance executer 106 performs the setting with regard to each maintenance item, the display of the progress of each maintenance item, the display of the results of each maintenance item, or the like.

The maintenance information storage 107 stores the results of each maintenance item executed by the maintenance executer 106. The results of maintenance item include, for example, an execution date and time of maintenance item, execution results of maintenance item, a maintenance plan based on the execution results of maintenance item. The results of each maintenance item stored in the maintenance information storage 107 are acquired from, for example, the maintenance item determiner 103 or the maintenance executer 106.

In FIG. 2, the case is described in which each function of the communicator 101, the device information storage 102, the maintenance item determiner 103, the device information setter 104, the display data generator 105, the maintenance executer 106, and the maintenance information storage 107, which the device maintenance apparatus 10 has, is implemented by software. However, one or more functions described above, which the device maintenance apparatus 10 has, may be implemented by hardware. In addition, each function described above, which the device maintenance apparatus 10 has, may be divided into a plurality of functions and executed. Two or more functions described above, which the device maintenance apparatus 10 has, may be combined and executed. This ends the description of the functional configuration of the device maintenance apparatus 100 with reference to FIG. 2.

Figure 3:
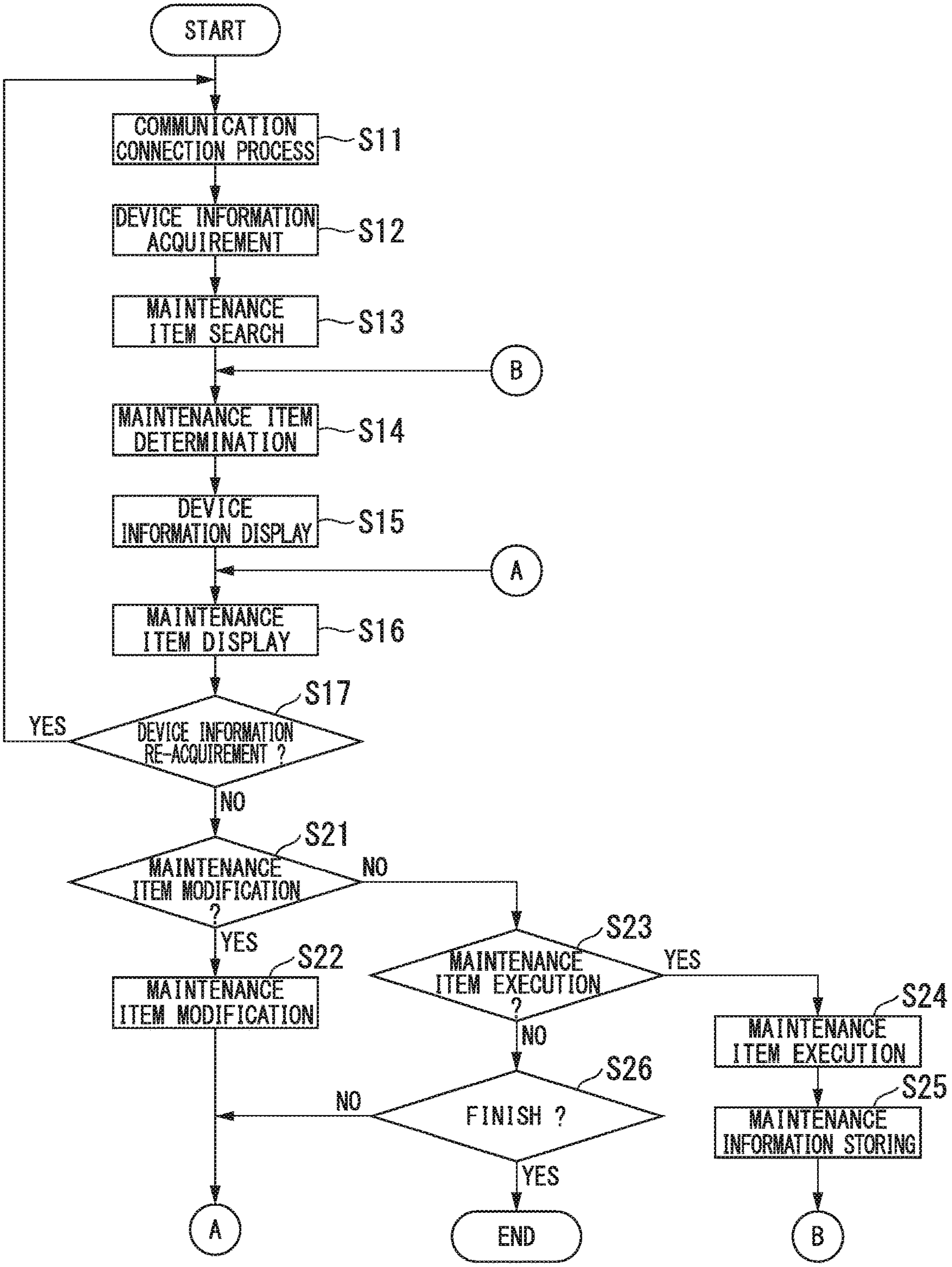
FIG. 3 is a flowchart showing an example of operations of the device maintenance apparatus according to the embodiment.

Next, the operations of the device maintenance apparatus 10 will be described with reference to FIG. 3. FIG. 3 is a flowchart showing an example of operations of the device maintenance apparatus 10 according to the embodiment. The operations of the device maintenance apparatus 10 to be described with reference to FIG. 3 are implemented by executing each function described with reference to FIG. 2 using, for example, the CPU of the device maintenance apparatus 10. In the following description, FIGS. 1 and 2 will be appropriately referred.

In FIG. 3, the device maintenance apparatus 10 performs a communication connection process (step S11). The communicator 101 communicatively connects to the field device 19 connected to the communication I/F 16 in conformance with a predetermined protocol to perform the communication connection process. For example, the device maintenance apparatus 10 connects to the field device 19 having a predetermined device address in conformance with a predetermined communication protocol.

After performing the process of the step S11, the device maintenance apparatus 10 acquires parameters (device information) from the connected field device 19 (step S12). The acquirement of the parameters from the field device 19 is performed by the communicator 101. For example, if two field devices 19 are connected in the step S11, the communicator 101 acquires parameters from each of the two field devices 19. In the steps S11 to S12, the case is described in which the parameters are acquired from the field device 19 connected via the communication I/F 16 by the communication. However, the parameters may be acquired by a method other than communication, for example, a camera or microphone attached to the device maintenance apparatus 1.

After performing the process of the step S12, the device maintenance apparatus 10 searches the maintenance items (step S13). The search of the maintenance items may be performed by the maintenance item determiner 103. The search of the maintenance items is performed using the information stored in the device information storage 102 in which the field device 19 and the maintenance items are associated with each other, based on the parameters of the field device 19 acquired in the step S12. For example, if the parameters of the two field devices 19 are acquired in the step S12, the device maintenance apparatus 10 searches the maintenance items associated with the parameters of each of the two field devices 19 and acquires the search results with regard to the two field devices 19.

After performing the process of the step S13, the device maintenance apparatus 10 determines the maintenance items to be displayed on the touch panel 15 as the execution buttons (step S14). The determination of the maintenance items in the step S14 means the determination whether or not displaying the respective execution button associated with each determined maintenance item. The determination of the maintenance items may mean the determination of the display order of the execution buttons to be displayed on the touch panel 15. The determination methods of the maintenance items will be described. One of the determination methods of the maintenance items exemplified below may be performed or two or more determination methods of the maintenance items exemplified below may be combined and performed. The device maintenance apparatus 10 may display selection buttons for selecting one or more of the predetermined determination methods of the maintenance items exemplified below. Thereby, the determination method of the maintenance items can be changed arbitrarily.

(Determination of Maintenance Items Based on Arbitrary Setting by Worker)

The determination of the maintenance items in the process of the step S14 is performed based on the setting arbitrarily and previously set by the worker. For example, the worker selects one field device 19 displayed on the touch panel 15 and selects one or more execution buttons associated with the selected one field device 19 from the selection page of maintenance items displayed on the touch panel 15. The selected maintenance items are stored in, for example, the device information storage 102. The maintenance item determiner 103 determines the maintenance items to be displayed on the touch panel 15 as the execution buttons based on the stored maintenance items. This determination method of maintenance items will be described later with reference to FIGS. 5A and 5B.

(Determination of Maintenance Items Based on Execution Results of Maintenance Items)

The determination of the maintenance items in the process of the step S14 is performed based on the execution results of maintenance items. For example, the maintenance items in which abnormalities have been detected in the previous execution of maintenance items are stored in the device information storage 102. The maintenance item determiner 103 determines the maintenance items to be displayed on the touch panel 15 as the execution buttons based on the maintenance items in which the abnormalities have been detected and stored. The number of maintenance items to be determined by the maintenance item determiner 103 is arbitrary.

(Determination of Maintenance Items Based on Execution Frequency of Maintenance Items)

The determination of the maintenance items in the process of the step S14 is performed based on the execution frequency of maintenance items. This method is another example of the above-described method based on the execution results of maintenance items. For example, the maintenance items frequently executed by the worker are stored in the device information storage 102. The maintenance items frequently executed may be determined based on, for example, the number of executions in the period of the past several months obtained from the execution results of maintenance items. The maintenance item determiner 103 determines the maintenance items to be displayed on the touch panel 15 as the execution buttons based on the stored maintenance items frequently executed. For example, the maintenance item determiner 103 determines a first maintenance item which has a highest execution frequency, a second maintenance item which has a second-highest execution frequency, and a third maintenance item which has a third-highest execution frequency from the maintenance items stored in the device information storage 102. The number of maintenance items to be determined by the maintenance item determiner 103 is arbitrary.

(Determination of Maintenance Items Based on Execution Plan of Maintenance Items)

The determination of the maintenance items in the process of the step S14 is performed based on the execution plan of maintenance items. For example, if the execution plan (maintenance plan) of maintenance items is previously generated, the maintenance plan is stored in the device information storage 102. The maintenance item determiner 103 determines the maintenance items to be displayed on the touch panel 15 as the execution buttons based on the stored maintenance plan. The executed maintenance items may be excluded from determination targets.

After performing the process of the step S14, the device maintenance apparatus 10 displays the parameters of the field device 19 acquired in the step S12 on the touch panel 15 (step S15). The parameters of the field device 19 displayed on the touch panel 15 in the process of the step S15 include, for example, basic information such as a device tag and a device ID of the field device 19 and measured data acquired from the field device 19.

After performing the process of the step S15, the device maintenance apparatus 10 displays, along with the parameters of the field device 19 displayed in the process of the step S15, the execution buttons of the maintenance items determined in the process of the step S14 on the touch panel 15 (step S16). Since the execution buttons of the maintenance items determined are displayed along with the parameters of the field device 19, the maintenance items with respect to the displayed field device 19 can be executed by one-touch.

After performing the process of the step S16, the device maintenance apparatus 10 determines whether or not performing re-acquirement of information of the field device 19, which has been performed in the process of the step S12 (step S17). For example, if the worker connects the device maintenance apparatus 1 to another field device 19 having another device address, the re-acquirement of information of this another field device 19 is required. The device maintenance apparatus 10 may determine whether or not performing re-acquirement in accordance with the presence or absence of evincive instructions from the worker or the change in the connection state of the communication I/F 16 automatically detected. If the device maintenance apparatus 10 determines to perform the re-acquirement (step S17: YES), the device maintenance apparatus 10 returns to the process of the step S11 and performs the re-acquirement of information of the field device 19.

On the other hand, the device maintenance apparatus 10 determines not to perform the re-acquirement (step S17: NO), the device maintenance apparatus 10 determines whether or not modifying the maintenance items. Various setting items are required to execute the maintenance items depending on the kind of the maintenance items. The modification of the maintenance items enables the re-setting of the setting items for executing the maintenance items. The device maintenance apparatus 10 may determines whether or not modifying the maintenance items in accordance with the presence or absence of evincive instructions from the worker or the presence or absence of the setting items which each of the maintenance items has.

If the device maintenance apparatus 10 determines to modify the maintenance items, the device maintenance apparatus 10 provides a UI for modifying maintenance items via the touch panel 15 (step S22). After performing the process of the step S22, the device maintenance apparatus 10 displays the maintenance items again in the process of the step S16.

On the other hand, the device maintenance apparatus 10 determines not to modify the maintenance items, the device maintenance apparatus 10 determines whether or not the execution buttons of the maintenance items are depressed (operated) by the worker (step S23). Whether or not the execution buttons of the maintenance items are depressed by the worker can be determined by monitoring the operation events of the touch panel 15 using the maintenance executor 106.

Figure 6:
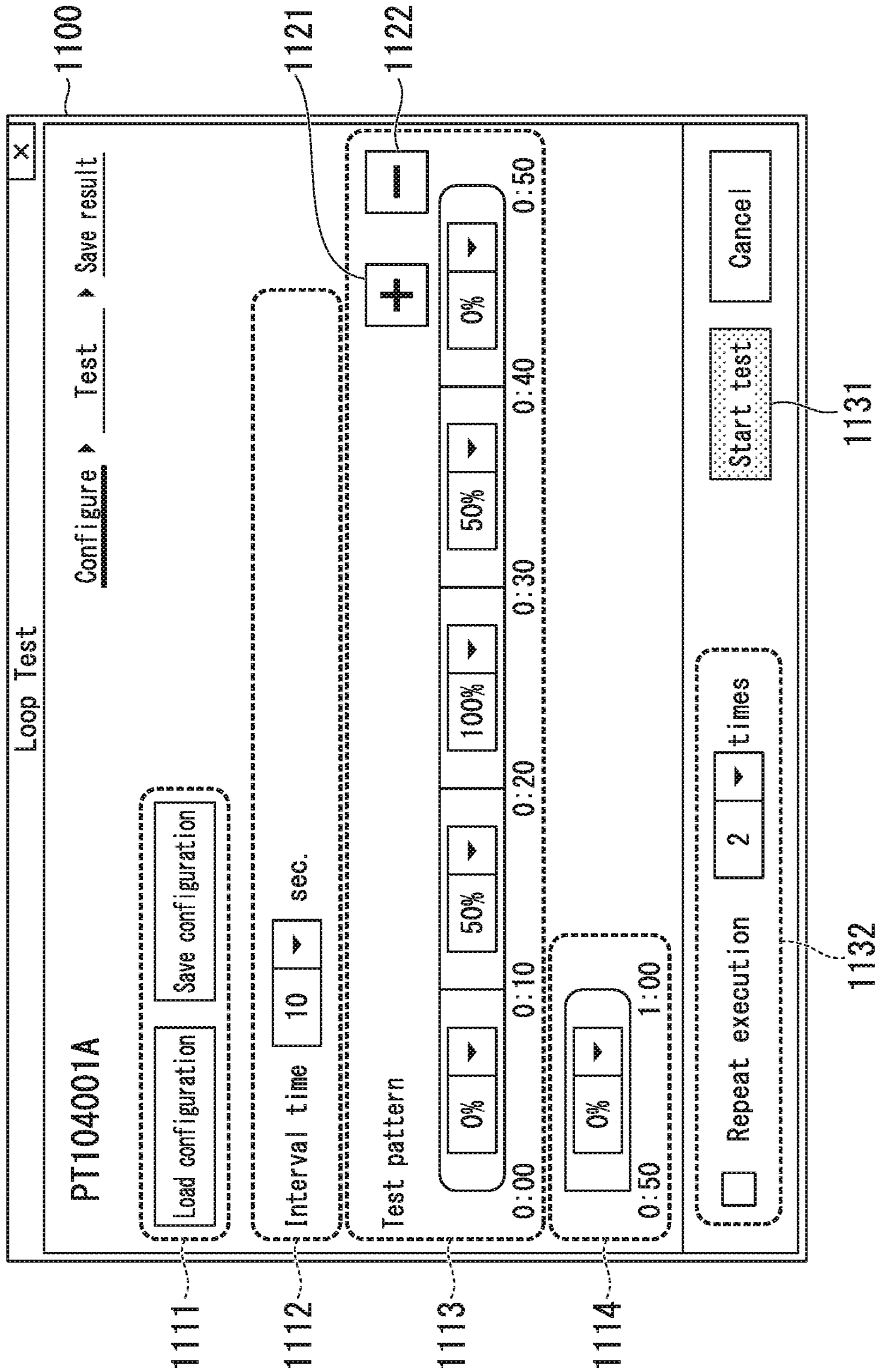
FIG. 6 is a diagram showing an example of setting pages for a loop test displayed by the device maintenance apparatus according to the embodiment.

When the device maintenance apparatus 10 determines that at least one execution button is operated by the worker (step S23: YES), the device maintenance apparatus 10 executes the maintenance item associated with the depressed execution button (step S24). The maintenance item may be executed immediately after the execution button is depressed or the maintenance item may be executed after the execution button is depressed and another display or operation is performed. For example, the maintenance item may be executed after the execution button is depressed, the page displayed on the touch panel 15 transitions to a page shown in FIG. 6, and a start button 1131 shown in FIG. 6 is depressed. In addition, the maintenance item may be executed after the execution button is depressed, a page for confirming whether or not executing the maintenance item or a page in which the content with regard to the execution is modifiable is displayed, and this page is operated.

The maintenance item can be executed by the maintenance executor 106. After the process of the step S24 is finished, the device maintenance apparatus 10 stores the results of the executed maintenance item (step S25). The results of the executed maintenance item may be stored in the maintenance information storage 107. After performing the process of the step S25, the device maintenance apparatus 10 returns to the process of the step S14 and performs the determination of the maintenance items again. That is, the determination of the maintenance items in the process of the step S14 is performed again in accordance with the results of the executed maintenance item. The reperformance of the determination of the maintenance items enables, for example, to cancel the display of the execution button associated with the executed maintenance item, to change the display order of the button associated with the executed maintenance item, or to display an execution button associated with another maintenance item in the touch panel 15.

On the other hand, the device maintenance apparatus 10 determines that the execution button is not operated by the worker (step S23: NO), the device maintenance apparatus 10 determines whether or not finishing the processes of the flowchart shown in FIG. 3 (step S26). Whether or not finishing the processes may be determined by detecting, for example, whether or not the display page of the touch panel 15 transitions to another display page from the display page in which the maintenance item can be executed, or whether or not a power switch is turned off. When the device maintenance apparatus 10 determines not to finish the processes (step S26: NO), the device maintenance apparatus 10 returns to the step S16 and performs the processes. On the other hand, the device maintenance apparatus 10 determines to finish the processes (step S26: YES), the device maintenance apparatus 10 finishes the processes of the flowchart shown in FIG. 3. This ends the description of the operations of the device maintenance apparatus 10 with reference to FIG. 3.

Next, the execution buttons displayed on the touch panel 15 of the device maintenance apparatus 1 will be described with reference to FIG. 4. FIG. 4 is a diagram showing an example of execution buttons associated with maintenance items displayed by the device maintenance apparatus 10 according to the embodiment.

In FIG. 4, a main page 1000 is displayed on the screen of the touch panel 15. The main page 1000 is displayed firstly, for example, after the device maintenance apparatus 1 is started up. The main page 1000 may be displayed after the device maintenance apparatus 1 is started up and then a login operation is performed for a login page not shown or an initial setting is performed.

The main page 1000 is used to display and register the parameters of the field device 19. The main page 1000 displays a device basic information display 1011, a parameter acquirement button 1012, a memo/image display 1013, a parameter display 1014, and a maintenance item button 1015. Hereinafter, the device basic information display 1011, the parameter acquirement button 1012, the memo/image display 1013, and the parameter display 1014 are collectively referred to as "device information 1010". The maintenance item button 1015 is displayed on the right of the device information 1010 in the main page 1000, along with the device information 1010. The main page 1000 is displayed on the touch panel 15 based on the display data generated by the display data generator 105.

FIG. 4 shows the case in which one field device 19 is connected. When a plurality of field devices 19 are connected, the device information 1010 for the connected field devices 19 is displayed. When the device information 1010 for the plurality of field devices 19 is displayed, each maintenance item button 1015 is displayed on the right of the respective device information 1010.

The device basic information display 1011 displays an icon, a device tag, a manufacture, a device address, a device ID, state of write protect, and the like of the connected field device 19. The parameter acquirement button 1012 includes an execution button for acquiring all parameters or parameters for a zero-point adjustment and a button for inputting the acquired parameters into an external file. The memo/image display 1013 includes a comment display column for displaying previously input comments (memo) with respect to the field device 19, which is a maintenance target, and a photograph display column for displaying a photograph of the field device 19. The parameter display 1014 displays the parameters acquired from the field device 19.

The maintenance item button 1015 includes an execution button of "loop test" for executing a maintenance item of a loop test, an execution button of "zero point adjustment" for executing a maintenance item of a zero point adjustment, and an execution button (report output operator) of "one-touch report" for outputting a maintenance report by one-touch. The operations of the execution button of "loop test", the execution button of "zero point adjustment", or the execution button of "one-touch report" enable to directly execute the maintenance items in the main page 1000. Either of the operations for executing the maintenance items in the present embodiment and the conventional operations for executing maintenance items with plural screen transitions from a menu item as described above may be selected and executed.

The maintenance item button 1015 may be displayed along with the execution results of the previously executed maintenance items. For example, the date and time when the loop test is executed last time, the execution results, and the like may be displayed near the execution button of loop test.

The main page 1000 includes an execution button (report output operator) of "all devices report output" for outputting maintenance reports of all devices. The execution button of "one-touch report" enables to output the maintenance report for each field device 19 and the execution button of "all devices report output" to output the maintenance reports of all field devices 19 at one time.

The main page 1000 includes a segment viewer switch button 1021, a device navigator switch button 1022, and an operation log switch button 1023. The main page 1000 is displayed under the condition that the segment viewer switch button 1021 is depressed. The device navigator switch button 1022 is provided to display a display page for registering device information to be executed by the device information setter 104. The operation log switch button 1023 is provided to display a display page for displaying the maintenance information stored in the maintenance information storage 107. This ends the description of the execution buttons associated with the maintenance items with reference to FIG. 4.

Hereinafter, the setting page of the execution buttons associated with the maintenance items, which is described in the "Determination of maintenance items based on arbitrary setting by worker", will be described with reference to FIGS. 5A and 5B. Each of FIGS. 5A and 5B is a diagram showing an example of setting pages of the execution buttons displayed by the device maintenance apparatus according to the embodiment.

Figure 5A:
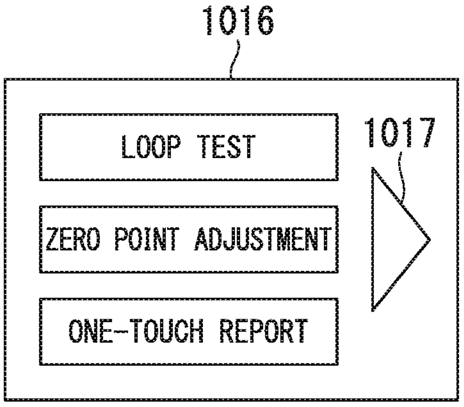
FIG. 5A is a diagram showing an example of setting pages of the execution buttons for executing maintenance items displayed by the device maintenance apparatus according to the embodiment.

In FIG. 5A, the maintenance item button 1016 is another embodiment of the maintenance item button 1015 shown in FIG. 4. The maintenance item button 1016 is displayed for each field device 19. The maintenance item button 1016 further includes a setting button 1017 in addition to the execution buttons associated with the maintenance items, which correspond to the maintenance item buttons 1015. The setting button 1017 is provided to enable the worker to arbitrarily set the execution buttons associated with the maintenance items to be displayed in the maintenance item button 1016. When the worker operates the setting button 1017, the page displayed on the display screen transitions to FIG. 5B from FIG. 5A.

Figure 5B:
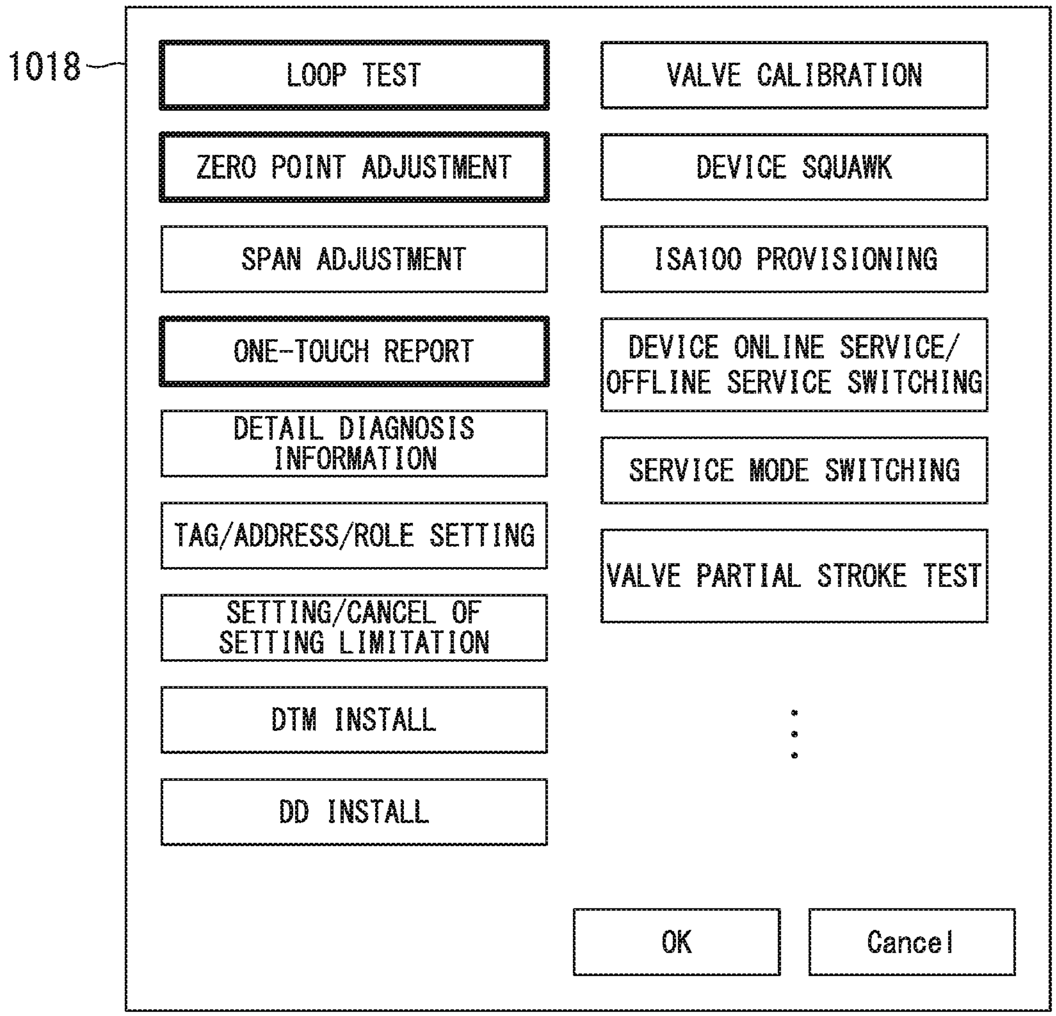
FIG. 5B is a diagram showing an example of setting pages of the execution buttons for executing maintenance items displayed by the device maintenance apparatus according to the embodiment.

In FIG. 5B, the maintenance items such as a loop test, a zero point adjustment, a span adjustment, an one-touch report, a display of detail diagnosis information, a tag/address/role setting, a setting/cancel of setting limitation, an install of a DTM, an install of a DD, a valve calibration, a device squawk, an ISA100 provisioning, a device online service/offline service switching, a service mode switching, a partial stroke test of a valve are selectably displayed in a maintenance item list 1018. FIG. 5B shows the state in which the maintenance items of the loop test, the zero point adjustment, and the one-touch report are selected and other maintenance items are not selected. The worker may touch the maintenance items, which the worker wants to display, to change the selection state. If the number of maintenance items displayable in the maintenance item button 1016 is three, the worker changes the maintenance item in the selected state to in the not-selected state. Thereby, other maintenance items can be in the selected state. The number of maintenance items displayable in the maintenance item button 1016 may be arbitrarily set. When the worker finishes the selection of the maintenance items, the worker depresses an OK button. The OK button is depressed, and thereby the set maintenance items are stored. When a Cancel button is depressed, the changes in the maintenance items are cancelled.

In the present embodiment, the field device 19 connected to the device maintenance apparatus 1 is shown but the field device 19 disconnected to the device maintenance apparatus 1 is not shown in the main page 1000. The setting of the execution buttons associated with the maintenance items shown in FIGS. 5A and 5B may be performed with respect to the field device 19 disconnected to the device maintenance apparatus 1. For example, the worker may select the field device 19, which is a setting target of the execution buttons associated with the maintenance items, based on the parameters of the field device 19 stored in the device information storage 102.

Since the worker can arbitrarily set the execution buttons associated with the maintenance items to be displayed in the maintenance item button 1016 for each field device 19, the efficiency of the maintenance work is improved. This ends the description of the setting page for the execution buttons associated with the maintenance items with reference to FIGS. 5A and 5B.

Next, a setting page for a loop test will be described with reference to FIG. 6. FIG. 6 is a diagram showing an example of setting pages for the loop test displayed by the device maintenance apparatus according to the embodiment. The loop test makes the field device 19 input output signals (test output values) of a predetermined output level into a host device such as a DCS in a control system of a plant or the like and checks the operations of the field device 19 or whether or not the field device 19 and the host device are appropriately connected to each other by a wire. In the present embodiment, the loop test using a pattern (referred to as a "test pattern") in which the output level (%) of output signals is changed for each interval time (second) will be described. The test pattern may include, in addition to the output level of output signals, information such as an interval time or the repeat count. FIG. 6 shows the setting page for setting the interval time and output level of output signals as the test pattern used in the loop test.

In FIG. 6, a setting page 1100 includes a load/save 1111, an interval time setting 1112, a test pattern setting 1113, a test pattern setting 1114, an output signal output block addition 1121, an output signal output block cancel 1122, and a start button 1131. The setting page 1100 displays the load/save 1111, the interval time setting 1112, the test pattern setting 1113, the test pattern setting 1114, the output signal output block addition 1121, the output signal output block cancel 1122, and the start button 1131 in the same page. The setting page 1100 is one embodiment of the setting operator, which allows for setting or changing the test pattern. The test pattern defines that the output signals output from the device are changed over time. In addition, each of the interval time setting 1112, the test pattern setting 1113, the test pattern setting 1114, the output signal output block addition 1121, and the output signal output block cancel 1122 is also an embodiment of the setting operator, which allows for setting the test pattern which defines that the output signals output from the device are changed over time. That is, the setting operator includes a display page, a button, or the like, which allows for setting the test pattern which defines that the output signals output from the device are changed over time.

The load/save 1111 is a button for loading (reading) or saving (storing) the test pattern set in the setting page 1100. The worker saves the generated test pattern and loads the saved test pattern, and thereby the worker can refer the saved test pattern when newly setting a test pattern or changing the test pattern. When a plurality of field devices 19 are tested using the same test patter, the saved test pattern is loaded for each test of the devices. Thereby, the load to generate the test pattern can be reduced and the work efficiency can be improved.

The interval time setting 1112 is a pulldown menu for setting and changing the interval time of the test pattern at each output level. The interval time is selectable from, for example, 3 seconds, 5 seconds, 10 seconds, and 15 seconds, using a pulldown menu. FIG. 6 shows that the interval time of 10 seconds is set in a text box. The interval time may be set by selecting from the pulldown menu or by directly inputting numerals into the text box using a keyboard or the like. The interval time set in the interval time setting 1112 means a time for keeping one output signal output (output time).

The test pattern setting 1113 is a button (including a pulldown menu) for setting the output level, which transitions in the test pattern. The test pattern setting 1113 includes an output signal output block for setting the output level. FIG. 6 shows that the output level transitions among five steps, in the order of 0% (10 seconds), 50% (10 seconds), 100% (10 seconds), 50% (10 seconds), and 0% (10 seconds), in five output signal output blocks. For example, when the output of the output signals are changed from 4 to 20 mA, the output level of 0% corresponds to 4 mA, the output level of 50% corresponds to 12 mA, and the output level of 100% corresponds to 20 mA. In particular, for example, the device maintenance apparatus 1 transmits to the field device 19 a command signal for outputting electrical current of 0% (4 mA) from the field device 19 to the host device or the like. Then, the field device 19, which receives this command signal, inputs the electrical current of 0% (4 mA) to the host device or the like in the period of the interval time. Therefore, the test pattern setting 1113 independently sets and changes the output level of the output signals (for example, electric current) for each output signal output block (each step).

FIG. 6 shows the case in which the interval time set in the test pattern is constant among the output levels set in all output signal output blocks. However, different interval times may be set for each output signal output block to be set or for each output level.

The output signal output block addition 1121 is a button for adding an output signal output block in the test pattern. The output signal output block addition 1121 adds to the set test pattern a step which defines output of output signals of arbitrary output level. The output signal output block cancel 1122 is a button for cancelling the output signal output block in the test pattern. The output signal output block cancel 1122 cancels an arbitrary step from a plurality of steps set in the test pattern. FIG. 6 shows that a sixth output signal output block is added to the test pattern setting 1114 by the depression of the button of the output signal output block addition 1121. The output signal output block addition 1121 and the output signal output block cancel 1122 enable the worker to arbitrarily set the number of the output signal output blocks.

Figure 7A:
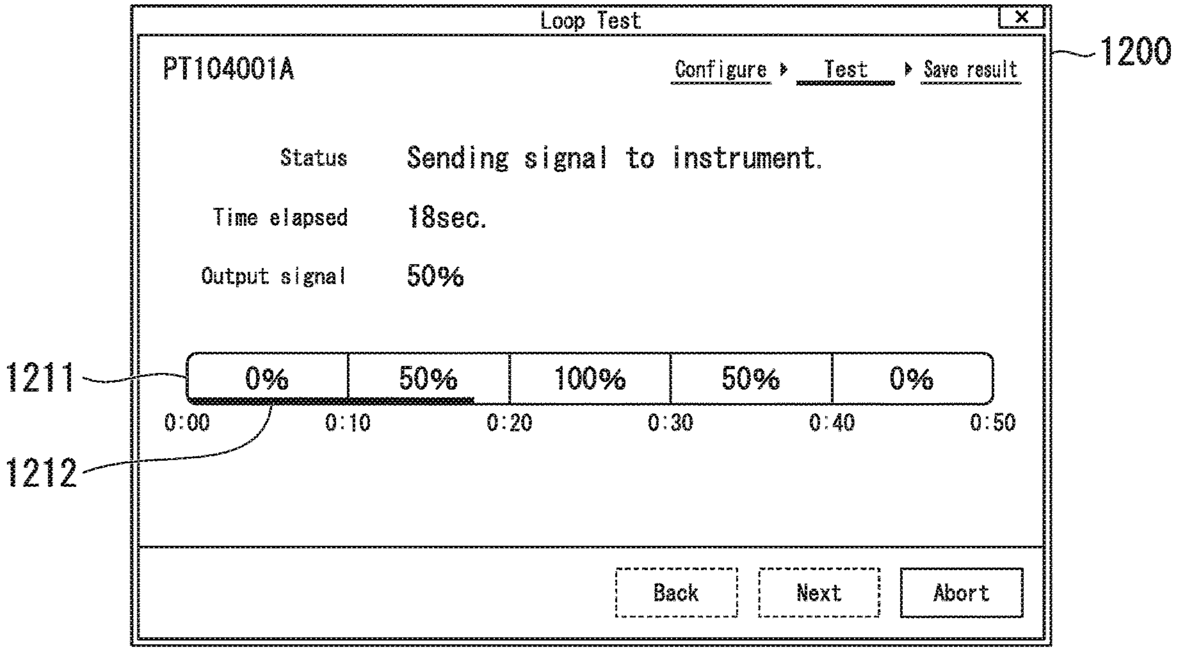
FIG. 7A is a diagram showing an example of execution pages for the loop test displayed by the device maintenance apparatus according to the embodiment.
Figure 7B:
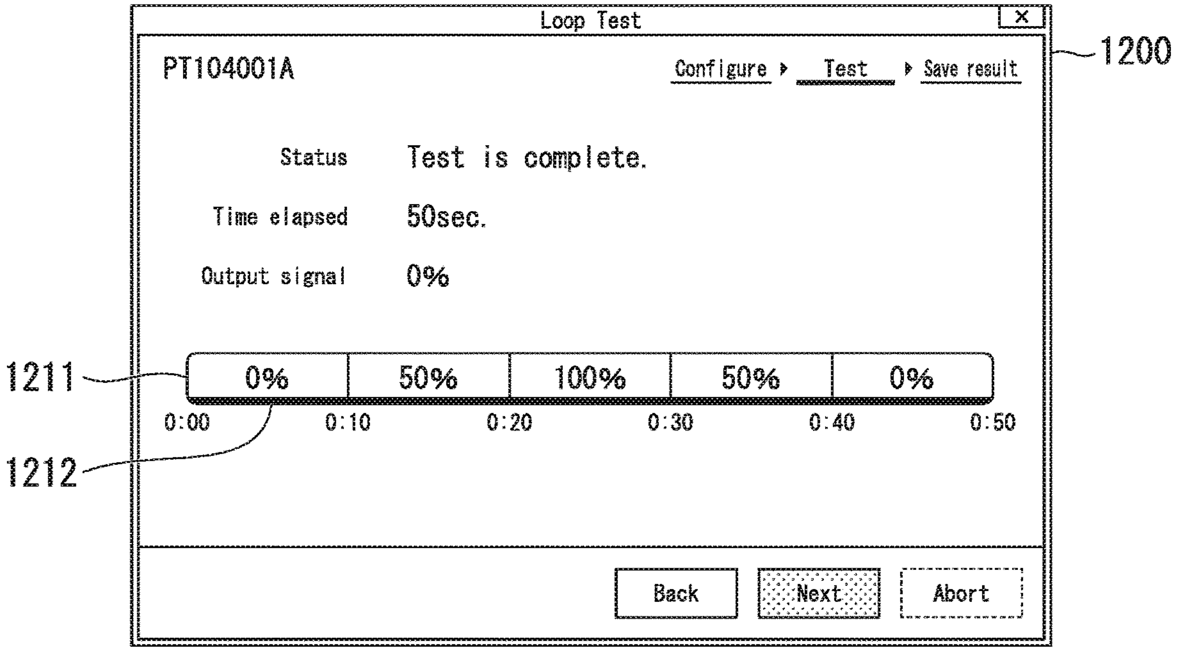
FIG. 7B is a diagram showing an example of execution pages for the loop test displayed by the device maintenance apparatus according to the embodiment.

The start button 1131 is provided to start (execute) the loop test. The start button 1131 is one embodiment of the execution operator for making the device execute the output of the output signals based on the set test pattern. The worker depresses the start button 1131 to make the field device 19 execute the loop test, and then the execution page of the loop test shown in FIGS. 7A and 7B is displayed on the touch panel 15. The repeat setting 1132 sets and changes the repeat count of output of output signals based on the test pattern executed when the start button 1131 is depressed. The worker can repeatedly execute the test based on the test pattern for number of times set by selecting a check box of the repeat setting 1132. This ends the description of the setting page for the loop test with reference to FIG. 6.

Next, the execution page for the loop test will be described with reference to FIGS. 7A, 7B, and 8. Each of FIGS. 7A and 7B is a diagram showing an example of execution pages for the loop test displayed by the device maintenance apparatus 1 according to the embodiment. FIGS. 7A and 7B show the progress of the loop test in the execution page 1200.

In FIG. 7A, the display "Sending signal to instrument" of "Status" in the execution page 1200 means that the output signals are currently transmitted. The display "18 sec" of "Time elapsed" means the elapsed time from the test start. The display "50%" of "Output signal" means that the current output level of output signals is 50%. In particular, for example, this means that the device maintenance apparatus 1 is transmitting to the field device 19 the command signals for making the field device 19 input the electrical current of 50% (12 mA) into the host device or the like.

The output signal output block 1211 shows the output level of output signals in the test pattern set in the setting page shown in FIG. 6. A progress bar 1212 graphically displays the progress of the loop test. FIG. 7A shows that the output signals having the output level of 50% are currently output in the second step of the output signal output block. The display of the progress bar 1212 enables the worker to easily understand the progress of the loop test.

FIG. 7B shows the execution page when the time is elapsed from FIG. 7A and the loop test is finished. In FIG. 7B, the display "Test is complete" of "Status" in the execution page 1200 means that the loop test is finished. The progress 1212 bar shows that the output of output signals having the output level of 0% in the fifth step of the output signal output block.

Figure 8:
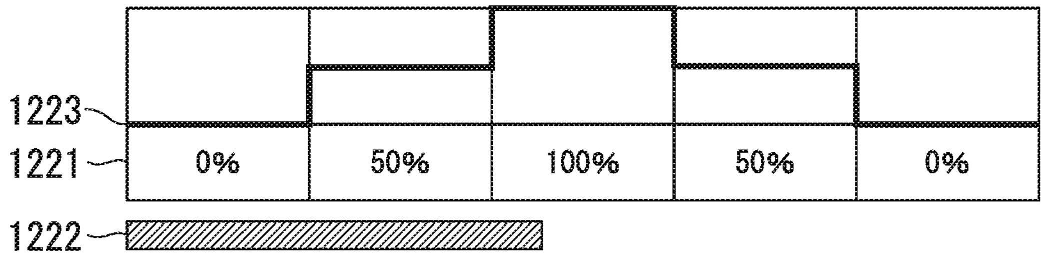
FIG. 8 is a diagram showing another example of execution pages for the loop test displayed by the device maintenance apparatus according to the embodiment.

FIG. 8 is a diagram showing another example of execution pages for the loop test displayed by the device maintenance apparatus according to the embodiment.

In FIG. 8, the functions of an output signal output block 1221 and a progress bar 1222 are similar to those of the output signal output block 1211 and the progress bar 1212 shown in FIGS. 7A and 7B. An output level display 1223 graphically displays the output level set in the output signal output block 1221. FIG. 8 shows the output level display 1223 represented by a line graph for each of the output levels 0%, 50%, and 100%. The display of the output level display 1223 enables the worker to easily understand the set output level.

FIG. 8 shows the case in which the output level display 1223 is represented by a line graph. However, the output level display 1223 may be represented by a bar graph, variations in display colors in a predetermined area, or the like in accordance with the output level. The output level may be represented by variations in sounds output from a speaker or the like, emission patterns of an LED lamp, or the like. This ends the description of the execution page for the loop test with reference to FIGS. 7A, 7B, and 8.

Figure 9:
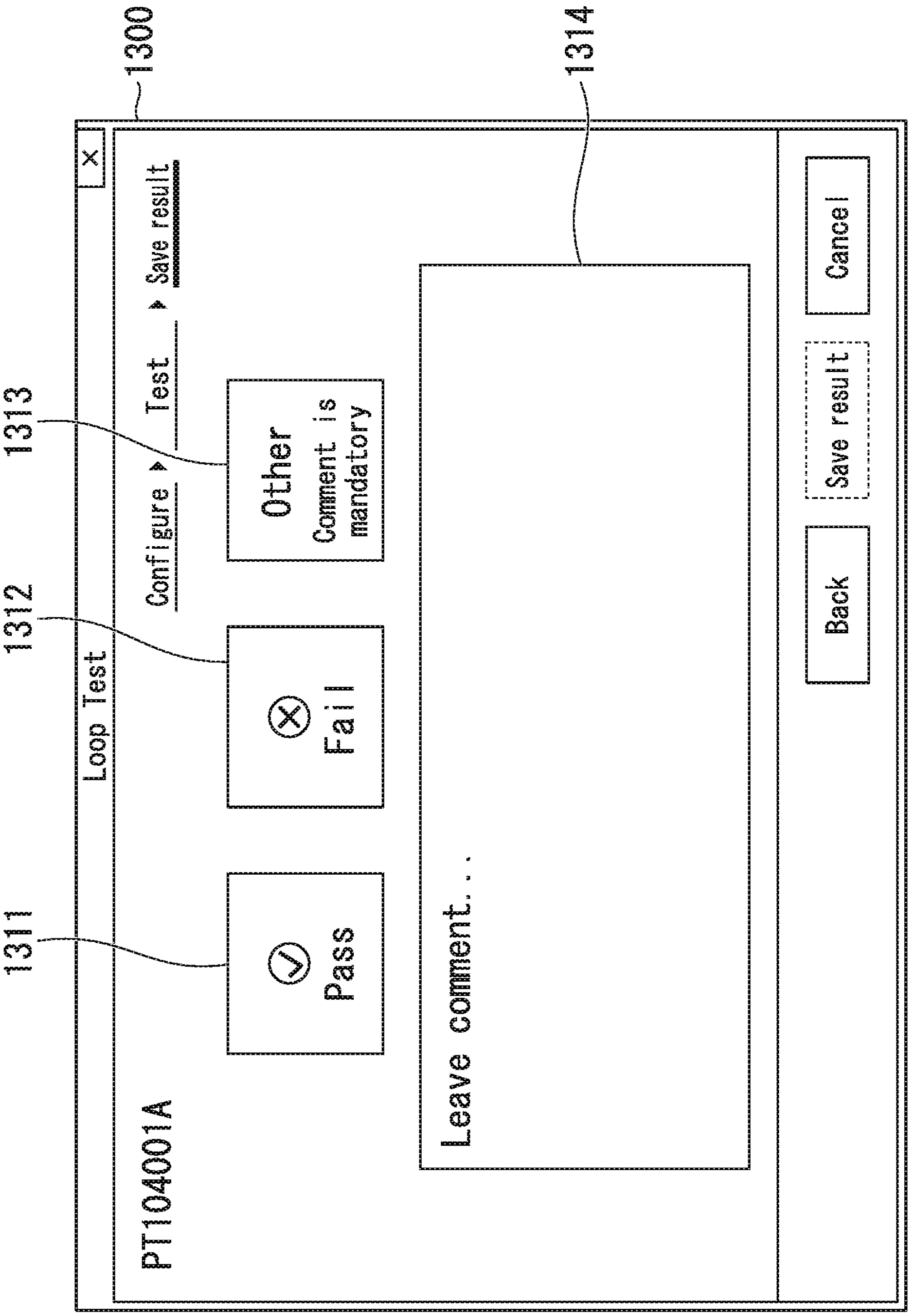
FIG. 9 is a diagram showing an example of result input pages for the loop test displayed by the device maintenance apparatus according to the embodiment.

Next, a result input page for the loop test and a result display page for the loop test will be described with reference to FIGS. 9 and 10. FIG. 9 is a diagram showing an example of result input pages for the loop test displayed by the device maintenance apparatus 1 according to the embodiment. The result input page for the loop test enables the worker to input the results of the loop test. In the loop test in the present embodiment, for example, a worker (who may be the same as or different from that operating the device maintenance apparatus 1) visually review the test results of the input and output level, the operations, and the like of the device processing the output signals output by the test patter. Therefore, the results of the loop test reviewed by the worker are manually input by the worker. FIG. 9 shows the UI which is provided for the worker and enables the worker to input the results. In particular, for example, the worker reviews whether instructed electrical current is transmitted from the field device 19 to the host device or the like.

In FIG. 9, a result input page 1300 includes buttons for inputting three types of results, a pass 1311, a fail 1312, and other 1313. In addition, the result input page 1300 includes a comment input 1314.

If the loop test is successful, the worker depresses the button of the pass 1311. If the loop test is failed, the worker depresses the button of the fail 1312. If the worker wants to record the results other than the pass and fail as the results of the loop test, the worker can depress the button of the other 1313 and leave the results as text. The input results of the button depression of the pass 1311, the fail 1312, or the other 1313 are stored in the maintenance information storage 107.

The comment input 1314 is a text box which enables the worker to input comments as text. The worker can leave comments with respect to the loop test or the device which is a target of the test along with the results such as a pass or fail. The comments input into the comment input 1314 may be displayed as a tag on the comment display column of the memo/image display 1013 described with reference to FIG. 4.

Figure 10:
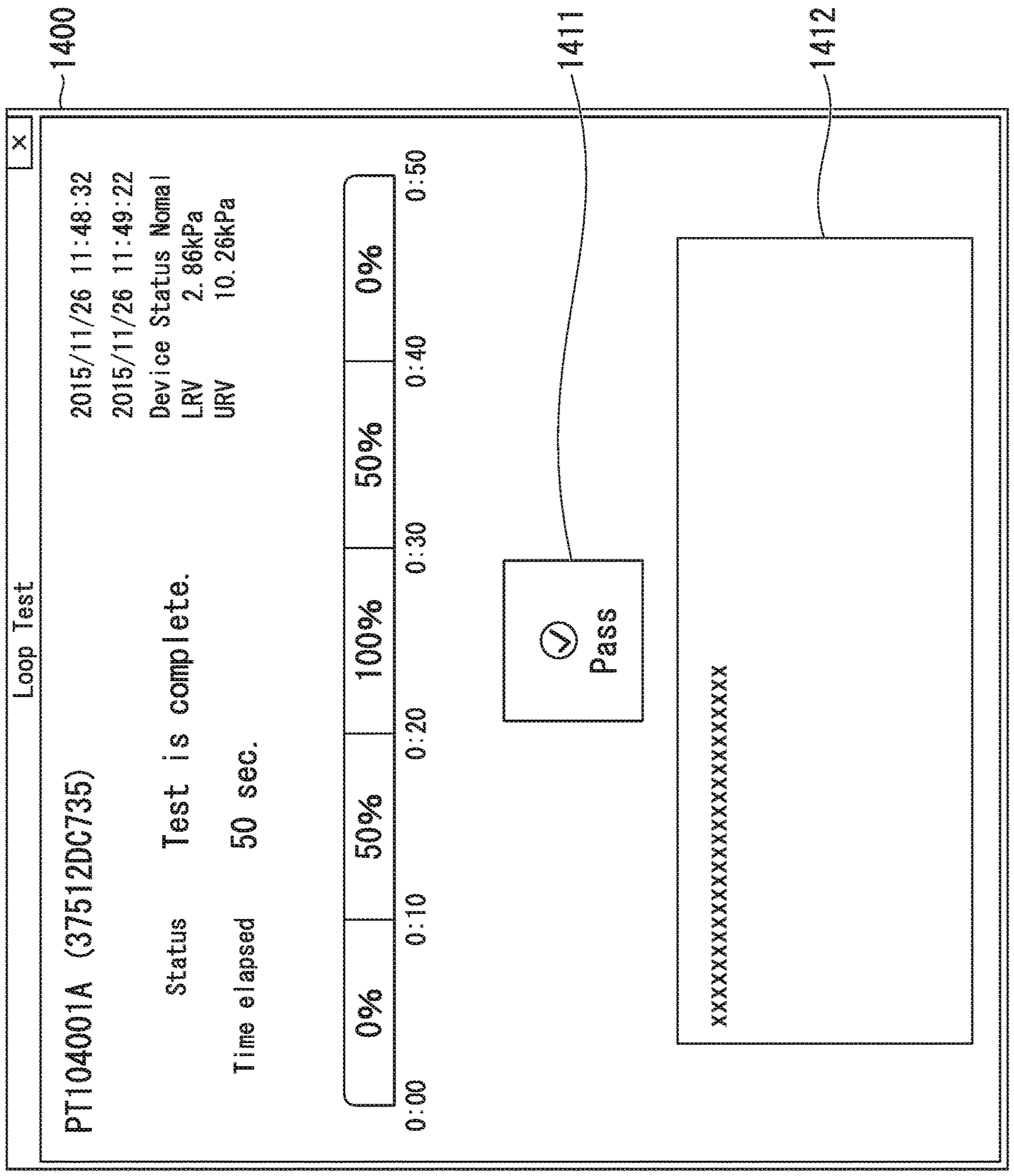
FIG. 10 is a diagram showing an example of result display pages for the loop test displayed by the device maintenance apparatus according to the embodiment.

FIG. 10 is a diagram showing an example of result display pages for the loop test displayed by the device maintenance apparatus according to the embodiment. The result display page shown in FIG. 10 is displayed after the results of the loop test are input in the result input page shown in FIG. 9.

In FIG. 10, a result display image 1400 includes a pass display 1411 and a comment display 1412. The pass display 1411 is displayed as the input result stored in the maintenance information storage 107 when the button of the pass 1311 is depressed in the result input page 1300 shown in FIG. 9. The comment display 1412 displays the texts input in the comment input 1314 of the result input image 1300 shown in FIG. 9.

The test results of the loop test such as a start date and time of the loop test, a finish date and time of the loop test, a measured minimum value, a measured maximum value, and the like are displayed on the upper section of FIG. 10. These results shown in FIG. 10 are stored in the maintenance information storage 107 shown in FIG. 2. This ends the description of the result input page and the result display page for the loop test with reference to FIGS. 9 and 10.

Figure 11:
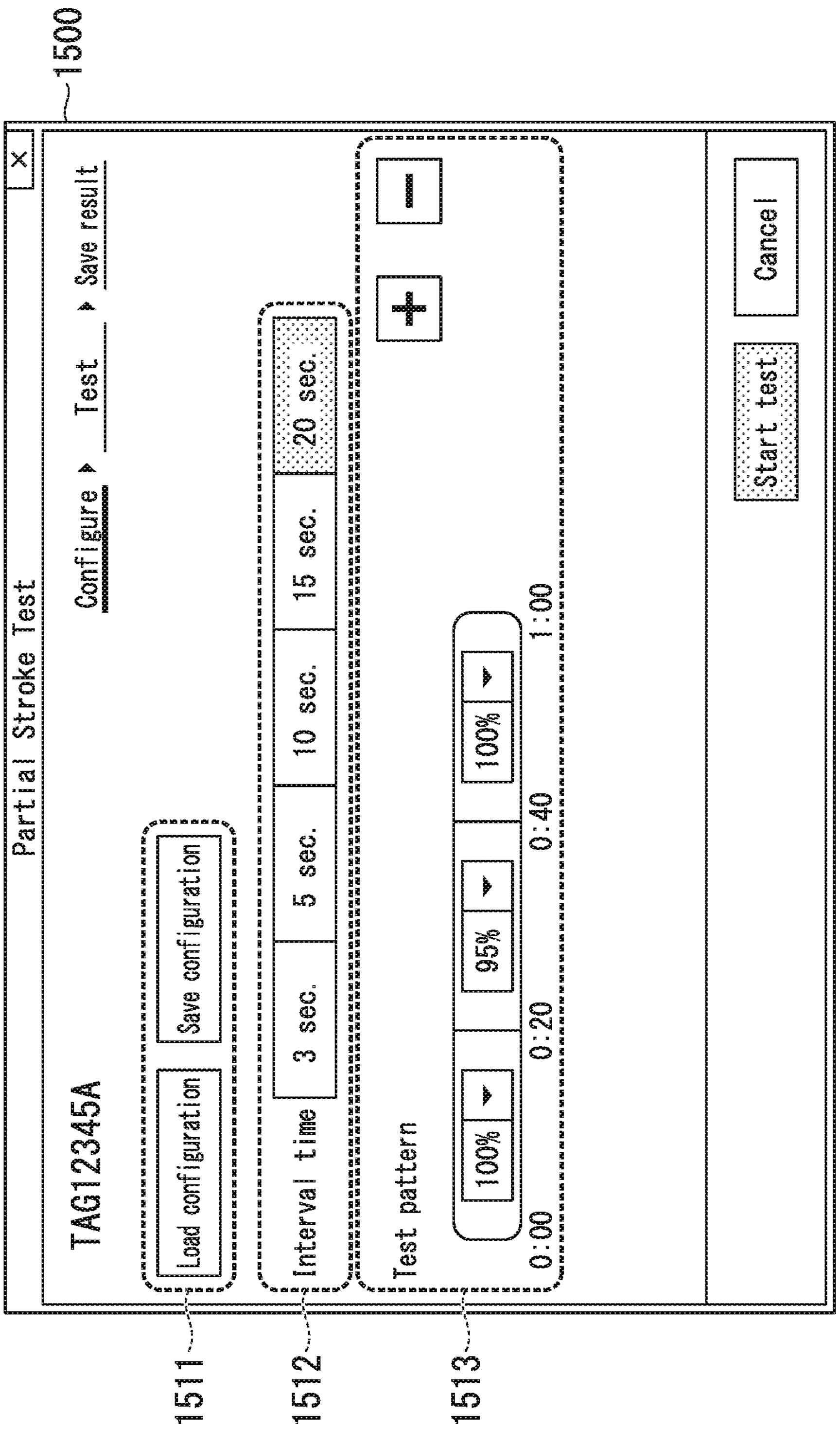
FIG. 11 is a diagram showing an example of setting pages for a partial stroke test displayed by the device maintenance apparatus according to the embodiment.

Next, a setting page for a partial stroke test will be described with reference to FIG. 11. FIG. 11 is a diagram showing an example of setting pages for a partial stroke test displayed by the device maintenance apparatus according to the embodiment.

The partial stroke test partially operates an actuator, which is a test target. In the partial stroke test, a valve such as an emergency block valve in a plant in operation is slightly operated in order to check the operation of the valve and whether or not the valve operates is checked.

In FIG. 11, a setting page 1500 includes a load/save 1511, an interval time setting 1512, a test pattern setting 1513, and the like, as with the setting page 1100 shown in FIG. 6. FIG. 11 shows a setting in which the output level (valve opening amount) transitions among three steps, in the order of 100% (20 seconds), 95% (20 seconds), and 100% (20 seconds) in the output signal output block of the text pattern setting 1513. That is, in the setting page 1500 of the partial stroke test, the output level of output signals is set for the partial stroke test, and thereby the setting page which is common to the setting page 1100 in the loop test can be used. In particular, for example, the device maintenance apparatus 1 transmits, to a device in which the valve opening amount is changed, a command signal to set the valve opening amount be 100%.

The setting page 1500 is one embodiment of the setting operator which allows for setting the test pattern. The test pattern defines that the output signals output from the device are changed over time. The interval time setting 1512 or the test pattern setting 1513 is also one embodiment of the setting operator, which allows for setting the test pattern which defines that the output signals output from the device are changed over time. In the partial stroke test, the execution page, the execution result input page, and the execution result display page may be displayed in a similar way to the loop test.

Hereinbefore, the example of the output signals in the loop test and the partial stroke test as output signals output from the field device 19 is described. However, the output signals output from the field device 19 may include contact signals such as ON/OFF signals, pulse signals specifying a frequency or pulse width, and the like. This ends the description of the setting page for the partial stroke test with reference to FIG. 11.

Figure 12:
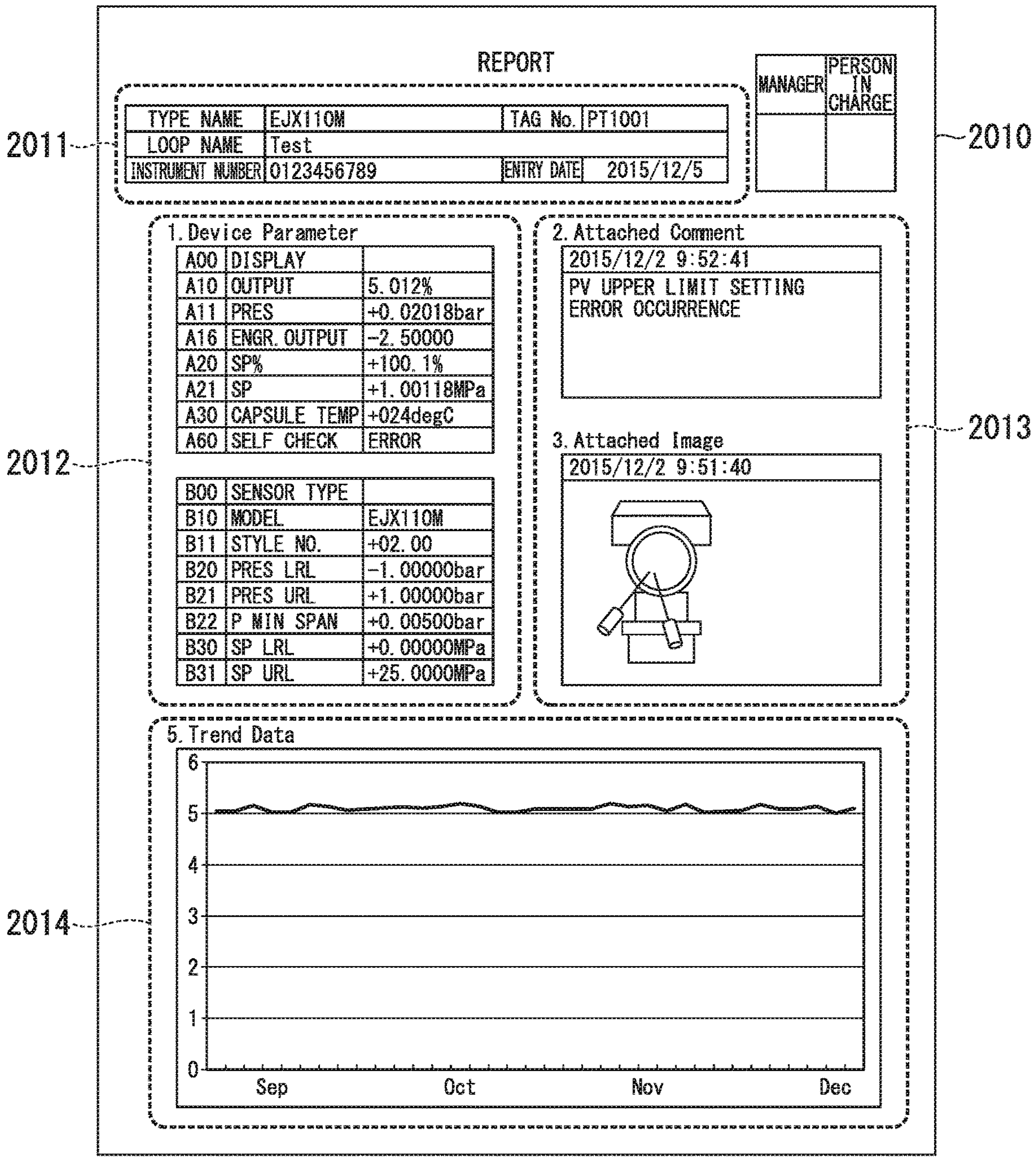
FIG. 12 is a diagram showing an example of reports output from the device maintenance apparatus according to the embodiment.

Next, a report is described output when the execution button of "one-touch report" described in the maintenance item button 1015 shown in FIG. 4, with reference to FIG. 12. FIG. 12 is a diagram showing an example of reports output from the device maintenance apparatus according to the embodiment. The report shown in FIG. 12 is output as predetermined electronic data. The report output as electronic data may be input into, for example, the touch panel 15. In addition, the report output as electronic data may be output to the outside of the device maintenance apparatus 1 as an electric file having a predetermined file format, or may be printed by a printer and output from the printer. FIG. 12 shows the report output as electronic data and printed by the printer.

In FIG. 12, a report 2010 includes first information 2011, second information 2012, third information 2013, and fourth information 2014.

The first information 2011 includes information of a "TYPE NAME", a "Tag No.", a "LOOP NAME", an "INSTRUMENT NUMBER", an "ENTRY DATE", and the like.

The second information 2012 includes information of "Device Parameter". For example, in communication standards used for field devises, items of parameters are defined in accordance with each communication standard. The items of parameters in accordance with each communication standard and the values of the items may be displayed in the "Device Parameter" of the report 2010.

The third information 2013 includes information of "Attached Comment" and "Attached Image". The "Attached Comment" displays texts arbitrarily input into the comment input 1314 shown in FIG. 9. The "Attached Image" displays a photograph of the field device 19 arbitrarily input. The third information 2013 includes the information displayed in the memo/image display 1013 shown in FIG. 4.

The fourth information 2014 includes information of "Test Data". The "Test Data" may display, for example, the aggregate results of the execution results of the maintenance items. FIG. 12 shows the case in which the execution results of the maintenance items in a predetermined period of time are aggregated and shown by a graph having a horizontal axis representing an execution date and a vertical axis representing a measured value. The "Test Data" may be displayed by a table in which the execution results of the maintenance items are aggregated.

FIG. 12 shows the example of the report with respect to one field device in which the "Tag No." is represented as PT1001. However, a report with respect to a plurality of field devices may be output. The report with respect to a plurality of field devices may be a report having a plurality of pages in which the report with respect to each field device is separately written in one of the plurality of pages. In addition, the report with respect to a plurality of field devices may be a report having a plurality of sheets in table format.

The report with respect to a plurality of field devices may be a report having one page in which the report with respect to a plurality of field devices is collected and the report of one page may be output. For example, only notable parameters among the first information 2011 and the second information 2012 which specify a field device may be output in table format. This ends the description of the report to be output with reference to FIG. 12.

In the present embodiment in which the display displays, along with the acquired device information, the operator for executing at least one maintenance item among the maintenance items associated the acquired device information and stored with respect to the device, the case in which the device information and the operator are displayed on the touch panel 15 is described. However, the display aspect in which the device information and the operator are displayed together is not limited to the shown aspect. For example, the device information and the operator may be displayed together on the same display page of the touch panel 15, or may be displayed together through scrolling of the page. In addition, another window is started by touching information such as an icon or character and the device information and the operator may be displayed together on another window. Alternatively, the page transitions or switches to another window by touching information such as an icon or character and the device information and the operator may be displayed together on another window. If a plurality of display panels are arranged, the device information and the operator may be displayed on different display panels from each other. The case is described in which the operator displayed along with the device information is displayed on a predetermined area, which is rectangular or the like. However, for example, the area of the operator on the touch panel is not specified, and the operator may be an operable target based on predetermined operations such as a long pressing, a swipe, or a pinch for the touch panel. The operator may be displayed on a lamp provided in a hardware switch or the like or a display and operated.

The display of the start button 1131 shown in FIG. 6 is not limited to the aspect shown. For example, the start button 1131 may be displayed on the setting page 1500 described as one example of the setting operator, may be displayed by scrolling through the page, or may be displayed in another window. The display aspect of FIGS. 6, 7A, and 7B may be displayed on the same display page, may be displayed by scrolling through the page, or may be displayed in another window.

The acquirement of parameters stored in the field device 19 may be executed as a maintenance item to be executed based on the operation of the operator. Regarding the maintenance item of the acquirement of the parameters stored in the field device 19, the device maintenance apparatus 1 may transmit a command signal for acquiring parameters to the field device 19, acquire parameters from the field device 19 in accordance with the command signal, and display the acquired parameters on the touch panel 15.

Regarding the maintenance items, the information (parameters, measured results, and the like) stored in the field device 19 may be output as a report by depressing the execution button of the one-touch report. In accordance with the depression of the execution button of the one-touch report, the device maintenance apparatus 1 may transmit a command signal for acquiring information to the field device 19, acquire stored information from the field device 19 in accordance with the command signal, incorporate the acquired information into the report, and output the report.

The above-described various processes of the present embodiment may be implemented by recording a program for implementing functions in the apparatus described in the present embodiment into a computer readable storage medium, making a computer system read the program stored in the storage medium, and executing the program. The "computer system" may include an operating system and a hardware such as a peripheral device. If the World Wide Web is used, the "computer system" may include an environment for providing homepage (or display environment). The "computer readable storage medium" indicates a portable medium such as a flexible disk, a magnetic optical disk, a ROM, a writable non-volatile memory such as a flash memory, a CD-ROM and a storage device such as a hard-disk embedded in a computer system.

In addition, the "computer readable storage medium" may include a medium for storing a program for a given length of time like a volatile memory (for example, a Dynamic Random Access Memory (DRAM)) embedded in a computer system, which is a server or client when a program is transmitted via a communication line such as a network including the Internet and a phone line. The above-described program may be transferred, from the computer system including the storage device storing this program, to another computer system, via a transmission medium, or by transmission waves in the transmission medium. The "transmission medium" that transmits the program means a medium having a function to transmit information, such as a network (communication net) like the Internet, or a communication line (communication wire) like a phone line like. The above-described program may be used to implement a part of the above-described functions. In addition, the above-described program may implement the above-described functions in cooperation with another program previously stored in the computer system, so-called difference file (difference program).

Although the foregoing has been a description of the embodiment of the present invention with reference to the drawings, the specific configuration of the present invention is not limited to the embodiments described above, and can be freely modified within the scope of the present invention.

What is claimed is:

1. A device maintenance apparatus, comprising:

a communicator configured to acquire device information from a field device installed in a plant; and a display data generator configured to generate first display data for displaying a main page, the main page comprising the acquired device information and a receiver displayed on the main page and configured to receive a determination of a maintenance item associated with the acquired device information, wherein the display data generator generates second display data for displaying a setting page of the maintenance item of which the receiver receives the determination, wherein the maintenance item comprises a test which makes the field device input output signals of a predetermined output level into a host device or an actuator, wherein the setting page comprises a setting operator configured to allow for setting a test pattern, the test pattern being set to define a change of output signals output from the field device over time, the output signals output from the field device being input into the host device or the actuator, wherein the setting operator comprises a first setter and a second setter, the first setter being configured to allow for independent setting the output level of the output signals at each of a plurality of points of time, the output level of the output signals transitioning in the test pattern, the second setter being configured to allow for setting an interval time for keeping the output level of the output signals, and wherein the display data generator generates third display data for displaying an execution page of the maintenance item based on the test pattern set in the setting page, the execution page comprising a progress bar displaying progress of the output of the output signals by the field device based on the test pattern.

2. The device maintenance apparatus according to claim 1, wherein the setting operator is configured to add to the set test pattern a step which defines output of output signals of arbitrary output level.

3. The device maintenance apparatus according to claim 1, wherein the setting operator is configured to cancel, from a plurality of steps set in the test pattern, an arbitrary step.

4. The device maintenance apparatus according to claim 1, wherein the setting operator is configured to set, in the test pattern, a repeat count of the output of the output signals by the field device based on the test pattern.

5. The device maintenance apparatus according to claim 1, wherein the setting operator is configured to graphically display the progress.

6. The device maintenance apparatus according to claim 1, wherein the setting operator is configured to display a button or pull-down menu allowing for changing an output level of the output signals and a pull-down menu allowing for changing a time for keeping the output signals for each output level in the same page.

7. The device maintenance apparatus according to claim 1, wherein the setting operator is configured to independently change the output level of the output signals for each step set in the test pattern.

8. The device maintenance apparatus according to claim 1, wherein the receiver is an execution button displayed in the main page and operable by a worker.

9. A device maintenance method, comprising:

acquiring device information from a field device installed in a plant;

generating first display data for displaying a main page, the main page comprising the acquired device information; and a receiver configured to receive a determination of a maintenance item associated with the acquired device information; and generating second display data for displaying a setting page of the maintenance item of which the receiver receives the determination, wherein the maintenance item comprises a test which makes the field device input output signals of a predetermined output level into a host device or an actuator, wherein, the device maintenance method further comprises, in the setting page, setting a test pattern to define a change of output signals output from the field device over time, the output signals output from the field device being input into the host device or the actuator, wherein setting the test pattern comprises setting the output level of the output signals at each of a plurality of points of time, the output level of the output signals transitioning in the test pattern, and setting an interval time for keeping the output level of the output signals, and wherein the device maintenance method further comprises generating third display data for displaying an execution page of the maintenance item based on the test pattern set in the setting page, the execution page comprising a progress bar displaying progress of the output of the output signals by the field device based on the test pattern.

10. The device maintenance method according to claim 9, further comprising:

adding to the set test pattern a step which defines output of output signals of arbitrary output level.

11. The device maintenance method according to claim 9, further comprising:

canceling, from a plurality of steps set in the test pattern, an arbitrary step.

12. The device maintenance method according to claim 9, wherein the setting of the test pattern comprises setting a repeat count of the output of the output signals by the field device in the test pattern.

13. The device maintenance method according to claim 9, wherein the display of the progress includes graphically displaying the progress.

14. The device maintenance method according to claim 9, further comprising:

displaying a button or pull-down menu allowing for changing an output level of the output signals and a pull-down menu allowing for changing a time for keeping the output signals for each output level in the same page.

15. A non-transitory computer-readable storage medium storing a device maintenance program, which when executed by a computer, causes the computer to:

acquire device information from a field device installed in a plant;

generate first display data for displaying a main page, the main page comprising the acquired device information, and a receiver configured to receive a determination of a maintenance item associated with the acquired device information; and generate second display data for displaying a setting page of the maintenance item of which the receiver receives the determination, wherein the maintenance item comprises a test which makes the field device input output signals of a predetermined output level into a host device or an actuator, wherein, the device maintenance program further causes the computer, in the setting page, to set a test pattern to define a change of output signals output from the field device over time, the output signals output from the field device being input into the host device or the actuator, wherein the setting of the test pattern comprising setting the output level of the output signals at each of a plurality of points of time, the output level of the output signals transitioning in the test pattern, and setting an interval time for keeping the output level of the output signals, and wherein the device maintenance program further causes the computer to generate third display data for displaying an execution page of the maintenance item based on the test pattern set in the setting page, the execution page comprising a progress bar displaying progress of the output of the output signals by the field device based on the test pattern.

* * * * *